United States Patent
Yu et al.

(10) Patent No.: US 11,463,159 B2
(45) Date of Patent: Oct. 4, 2022

(54) SATCOM GSM SOLUTION DIRECTLY COMMUNICATE WITH GSM PHONES

(71) Applicant: AST & Science, LLC, Miami, FL (US)

(72) Inventors: Zhi Zhong Yu, Reading (GB); Federico Pedro Fawzi, Midland, TX (US); Abel Avellan, Coral Gables, FL (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/666,234

(22) Filed: Feb. 7, 2022

(65) Prior Publication Data

US 2022/0255619 A1 Aug. 11, 2022

Related U.S. Application Data

(60) Provisional application No. 63/165,404, filed on Mar. 24, 2021, provisional application No. 63/146,322, filed on Feb. 5, 2021.

(51) Int. Cl.
*H04B 7/185* (2006.01)
*H04B 7/01* (2006.01)

(52) U.S. Cl.
CPC ........... *H04B 7/18513* (2013.01); *H04B 7/01* (2013.01); *H04B 7/1853* (2013.01)

(58) Field of Classification Search
CPC .... H04B 7/18513; H04B 7/01; H04B 7/1853; H04B 7/18504; H04B 7/18506; H04B 7/18508; H04W 84/005; H04W 84/06
See application file for complete search history.

(56) References Cited

U.S. PATENT DOCUMENTS

| 5,552,798 | A | 9/1996 | Dietrich et al. |
| 5,918,157 | A | 6/1999 | Wiedeman et al. |
| 10,979,133 | B2 | 4/2021 | Avellan et al. |
| 11,159,228 | B2 * | 10/2021 | Avellan ............. H04B 7/18513 |

(Continued)

FOREIGN PATENT DOCUMENTS

| EP | 1091506 A2 | 4/2001 |
| WO | WO-2020/074747 A1 | 4/2020 |

OTHER PUBLICATIONS

Morant, Maria, et al. "Experimental demonstration of mm-wave 5G NR photonic beamforming based on ORRs and multicore fiber." IEEE Transactions on Microwave Theory and Techniques 67.7 (2019): 2928-2935. (Year: 2019).*

(Continued)

*Primary Examiner* — Sharad Rampuria
(74) *Attorney, Agent, or Firm* — Blank Rome LLP

(57) ABSTRACT

A GSM satellite communication system is in communication with a first satellite having a first field of view including a first plurality of cells in which a plurality of active User Equipment (UEs) are located. The plurality of active UEs are in direct communication with the first satellite. The satellite communication system includes a first feeder link and a first tracking antenna configured to communicate with the plurality of active UEs via the first satellite directly serving the first plurality of cells; a first processing device configured to communicate with the plurality of active UEs; and a second processing device configured to normalize delay for a plurality of beam centers of the first plurality of cells, and provide the normalized delay to the first processing device.

24 Claims, 6 Drawing Sheets

(56) References Cited

U.S. PATENT DOCUMENTS

| | | |
|---|---|---|
| 2004/0207556 A1 | 10/2004 | Spilker, Jr. et al. |
| 2006/0154660 A1 | 7/2006 | Waugh et al. |
| 2019/0238216 A1 | 8/2019 | Avellan et al. |
| 2021/0029658 A1 | 1/2021 | Mahalingam et al. |

OTHER PUBLICATIONS

International Search Report & Written Opinion for PCT/US2022/015502, dated May 2, 2022, 19 pgs.

"Digital Cellular Telecommunications System (Phase 2+); Physical layer on the radio path; General Description (GSM 05.01)", GSM—Global System for Mobile Communications, European Telecommunications Standards Institute, May 1996, 20 pgs.

* cited by examiner

SATCOM GSM SOLUTION DIRECTLY COMMUNICATE WITH GSM PHONES

CROSS-REFERENCE TO RELATED APPLICATION

This application claims the benefit of U.S. Provisional Application No. 63/146,322, filed Feb. 5, 2021, and the benefit of U.S. Provisional Application No. 63/165,404, filed Mar. 24, 2021, contents of both of which are hereby incorporated by reference in their entirety.

BACKGROUND

Being the first global telecom success, GSM has the biggest footprint on earth, its commercial success not only because it has the longest history in operation, but also the cheapest handset that meets the voice call demands as well as its well-known SMS. Its major update GPRS, and EGPRS, also started mobile internet, which pave the way for 3G 4G and 5G.

The telecom market had been moved further to 5G, but GSM is still there in most part of the world. There are still over 1 billion people globally had never owned a mobile phone, and GSM service for them is still a great improvement for their life and work. GSM is still needed in many least developed countries (listed as LDCs by UN). To them get connected enables many great opportunities. It would jump start new economic growth and make many to have better and happier lives.

However, GSM terrestrial network establishment in LDC would not be so easy, as it needs to start with telecom fixed line network infrastructure. Some places have no electricity, and only started to have solar power. There is no fixed line communication system at all for most people, and electricity coverage is not 100%. Many places also have issues maintaining the safety of the cables, equipment and the assets doted sparsely.

Standard GSM User Equipment (UE), such as a GSM handset or GSM phone, communicates with a GSM base station (BTS) having ground-based cell towers that are within close range, typically up to 35 km and for extended TA feature 120 km. It does not communicate with a satellite, because of, for example, issues of the latency caused by the distance between base station-satellite-UE and the Doppler effect cause by the satellite at the speed of 7 km/sec to 8 km/sec, where intolerable latency and the Doppler effect with dynamic change as satellite flies over the UE being served by the satellite and on the earth, including the flying aircraft.

What is needed is a satcom GSM system directly talking to the GSM handsets which may be charged by solar power without relying on power grid and ground level telecom infrastructure over the country. To make it work, the BTS SW modification together with the latency normalization and Doppler compensation will be the necessary, which are disclosed in this filing.

SUMMARY

In the present disclosure application, the innovative modifications to base transceiver station (BTS), the GSM base station, housed in gateway sites, and a new sat RAN satellite beam handover mechanism allow a constellation of satellites with large enough phase array directly talk to the GSM handsets which may be charged by solar power without relying on mains electricity and ground level telecom infrastructure over the country or region. BTS/Core network (CN) satcom GSM of the present disclosure can directly talk to commercial unmodified GSM UEs for voice and data call.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail using the drawings, in which.

DETAILED DESCRIPTION

Figure 1A:
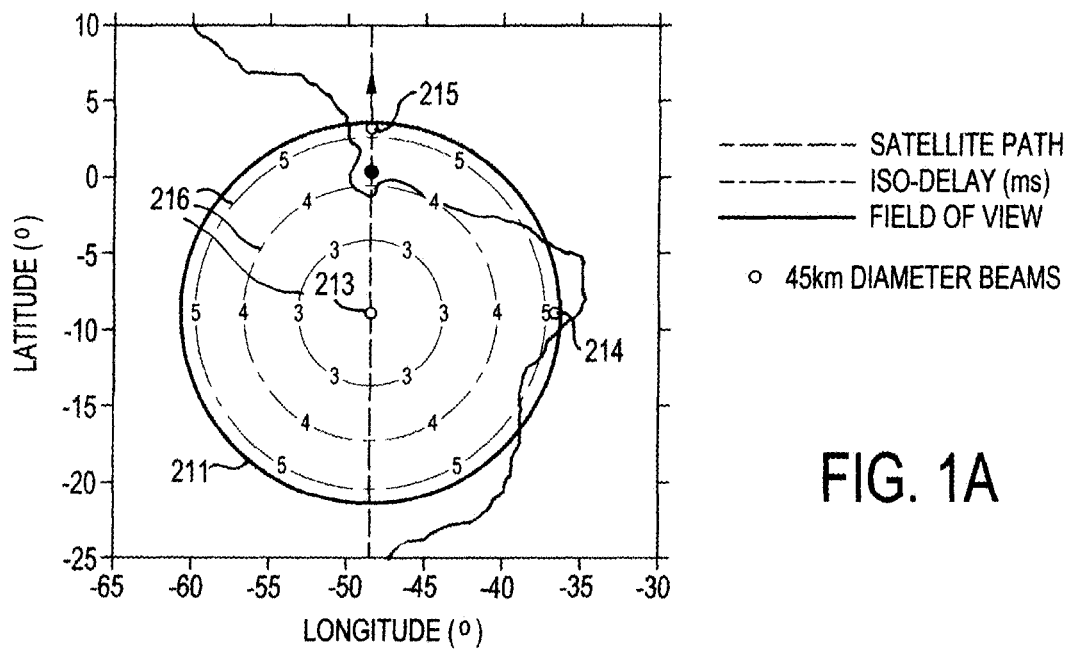
FIG. 1A illustrates iso-delay contours in satellite field of view (FOV) and delay issue.

U.S. patent application Ser. No. 17/583,992 discloses satellite radio access network (Sat RAN) beam and gateway seamless handover, the content of which is hereby incorporated by reference in its entirety.

The satcom GSM is based on GSM 3GPP specs as it aims to work with standard GSM phones user equipment (UE). The details of the global-system-for-mobiles (GSM) are fully described in 3GPP specs. The GSM frame structure is observed to let all the commercial GSM handsets work with satcom GSM. Below are the key innovative modifications on GSM BTS that enable the satcom GSM. For the efficiency of the description the text will avoid stating the terrestrial network (TN) GSM system details but focusing on the changes. Here the mobile subscriber (MS) is equivalent to user equipment (UE).

The GSM frame structure is shown in GSM 05.01, Digital cellular telecommunications system (Phase 2+); Physical layer on the radio path; General description (GSM 05.01) (etsi.org), GSM Technical Specification, Global System for Mobile Communications, Version 5.0.0, May 1996 (herein, the "GSM Specification"), the entire content of which is hereby incorporated by reference. FIG. 1 of the GSM Specification describes the frame structure of both downlink (DL) and uplink (UL) which is the same at this level with 3 timeslot offset. The sat GSM modification is done on BTS software for the UL Rx timing without any modification on GSM handsets and the BTS DL, as the DL structure to meet the expectation of an unmodified GSM UE. The BTS Rx timing needs changes as the UL is no longer 3 timeslots, the round-trip time (RTT) can be tens of milliseconds when satellite relay is involved.

Observing the GSM specs as shown in FIG. 1 of the GSM Specification, the present disclosure shows and teaches a BTS 12 (such as 12A, 12B) and a channel-routing-and-compensating device 10, which, when working with a satcom satellite network system, can turn a GSM phone into a sat phone (i.e., satellite phone) without any changes to the phone. That is, with the BTS 12 and the channel-routing-and-compensating device 10 of the present disclosure, a normal GSM phone, UE 30, can communicate directly with a satellite (such as 20A, 20B) via beam (such as 16, 17), without a ground cell tower and without any modification to normal GSM phone; and the normal GSM phone, UE 30, can communicate with the BTS 12, via the satellite 20 and the channel-routing-and-compensating device 10. The mechanism that takes full advantage of the satellite is described below.

In an example embodiment, a large phase array can be used to deliver hundreds of electronically steerable beams to provide 3GPP radio access network (RAN) services to the cells fixed on the ground, for instance as shown in U.S. Pat. Nos. 11,159,228 and 10,979,133, which are hereby incorporated by reference. Delay normalization can be applied. Doppler compensation can be applied. A satellite beam handover with the BTS farm in the satellite GW sites can be enabled.

It should be noted that a normal phone on airborne plane can also be tracked and served by the satellite; and to sat RAN system, it is a moving cell configuration and can be served just as easy as a ground cell, as long as it is arranged. Or, are ground cells fixed on a surface of earth that includes land and ocean.

A diagrammatic representation of time frame structures is illustrated in FIG. 1 of the GSM Specification. As shown, 1 hyperframe has 2048 superframes, which has 2715648 TDMA frames. The hyperframe is the longest recurrent time period of the structure, and has a duration of 3 hours, 28 minutes, 53 seconds, and 760 ms (or 12,533.76 seconds). The TDMA frames are numbered modulo this hyperframe (TDMA frame number, or FN, from 0 to 2715647), and this long period is needed to support cryptographic mechanisms defined in GSM 03.20.

One hyperframe is subdivided in or corresponds to 2048 superframes, and a superframe has a duration of 6.12 seconds, and has 1326 TDMA frames. The superframe is the least common multiple of the time frame structures. The superframe is itself subdivided in multiframes, and two types of such multiframes exist in the system. A superframe has or corresponds to fifty-one 26-frame multiframes and twenty-six 51-frame multiframes. The 26-frame multiframe has a duration of 120 ms and comprises 26 TDMA frames. The 26-frame multiframe is used to carry TCH (and SACCH/T) and FACCH. The 51-frame multiframe has a duration of ≈235.4 ms (3060/13 ms) and comprises 51 TDMA frames. The 51-frame multiframe is used to carry BCCH, CCCH (NCH, AGCH, PCH and RACH) and SDCCH (and SACCH/C). A TDMA frame has a duration of approximately 4.62 ms, and comprising eight time slots. One TDMA frame has 8 time slots (120/26 or 4.615 ms), and one time slot has 156.25 bit durations (15/26 or 0.577 ms), where 1 bit duration is 48/13 or 3.69 μs.

Figure 3:
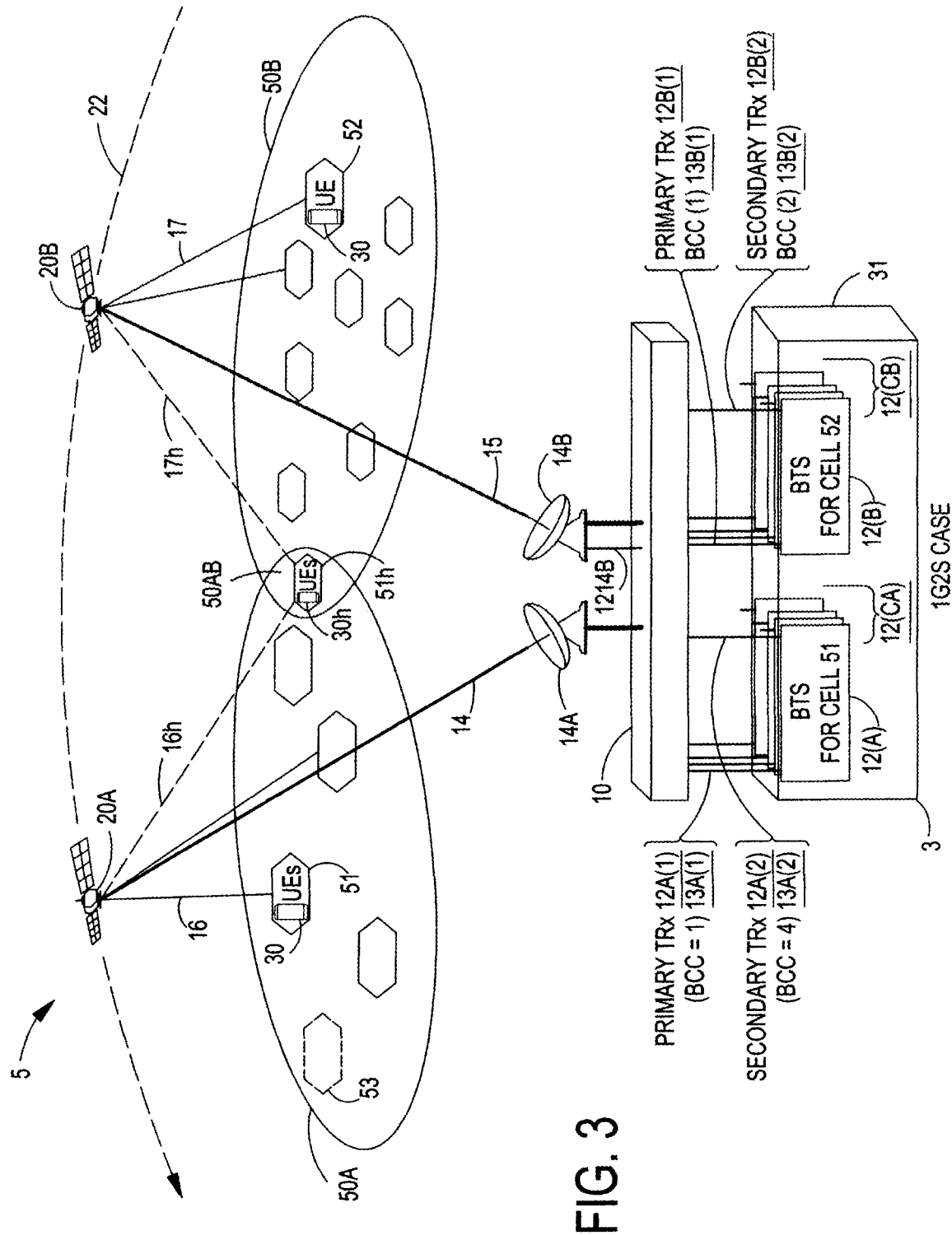
FIG. 3 is an illustration of LEO satcom field of view (FoV) and the overlapping situation where beam handover happens.

The RTT for the feeder links and service links, up and down, can be compensated to the longest one, e.g., 40 ms, then for GSM frame length, the closet one is 9 TDMA frames, or 72 time slots that provide about RTT 41.5 ms, by, e.g., a routing-and-compensating device 10 (FIG. 3). So all the cells served by the GW (e.g., GW antenna or including GW antenna) and sat will have RTT 41.5 ms, which provide the baseline for simple BTS change to work in satellite GSM system. Other RTT values can be used according to the RF path length and the TA range, and same or similar concept applies.

Satellite (such as 20A, 20B in FIG. 3) plays a role of layer 0 (RF, the lowest physical layer) relay, taking the DL signal from BTS (such as 12A, 12B in FIG. 3) on gateway site 31 by a feeder link (e.g., in Q band) and beaming down to ground cell by the GSM service link in the local designated licensed band. GSM phone's UL signal is then picked up and sent to gateway BTS by satellite. The random-access channel (RACH) response timer is 15 seconds (3GPP TS 44.18) which is fine for RTT 41.5 ms long RF path delay. The modifications on BTS are (or include) mainly the Transmitting and Receiving timing to fit into long RF delay situations. The major changes on BTS is (or includes) a configurable parameter on the UL receiving time delay, generally in the unit of time slots. The normal BTS would have a fixed constant of 3 time slots, and with the disclosed sat RAN design, this disclosure enables very simple changes to BTS software and make it work with legacy UEs. For example, BTS (or one or more processing devices of BTS) can be configured to adjust expected receiving timing and set a timer according to the normalized delay.

The delay normalization is made to the longest delay path in the system plus the time for the signal processing, which for LEO satellite can be 20 ms for DL and UL. So an example friendly number to the BTS software modification is 72 GSM time slots which are 9 GSM TDMA frames as shown in FIG. 1 of the GSM Specification. To GSM UEs, they see exactly the same frame structure and TRx in the same way as they do to the terrestrial network (TN), hence legacy UEs are turned into satphone (i.e., satellite phone) without any changes to the phone.

The GPRS RLC layer HARQ can tolerate 40 ms in packet data call without any modification. GPRS USF takes 1 to 4 bursts to decode, then BTS expects UE UL in the next frame, that is only 4.615 ms, as UE Tx will take 20 ms to reach BTS PCU and that needs modification on the BTS side. NAS timer is usually multiple of 15 seconds which is okay for long RTT around 40 ms.

Figure 1B:
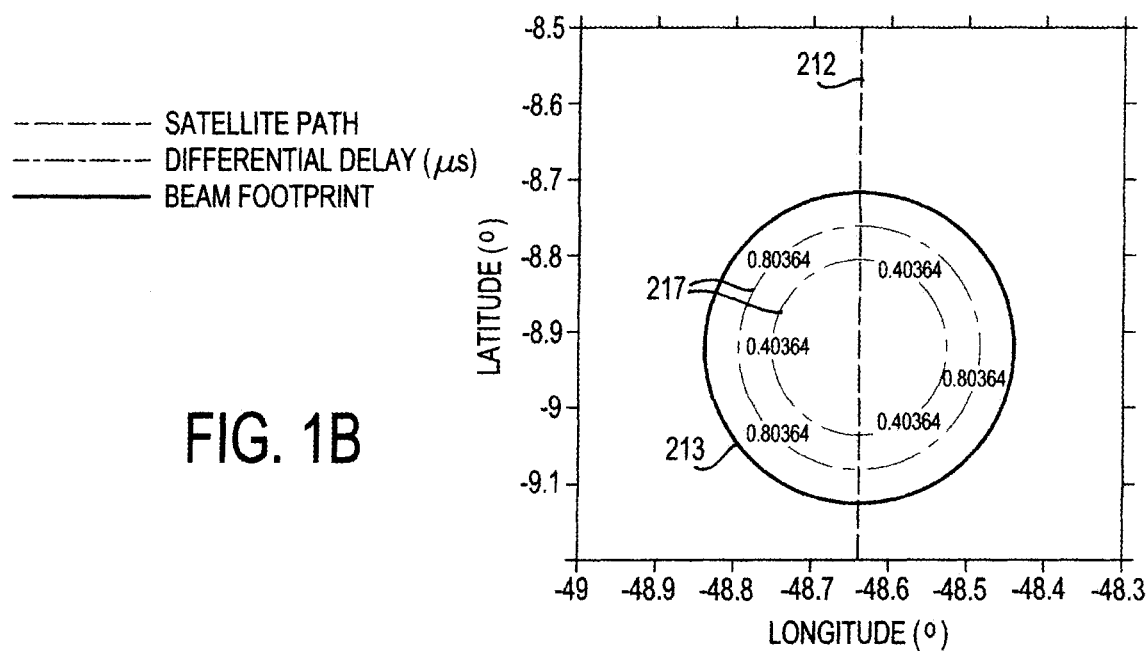
FIG. 1B illustrates differential delays for central-beam in satellite FOV after delay normalization.
Figure 1C:
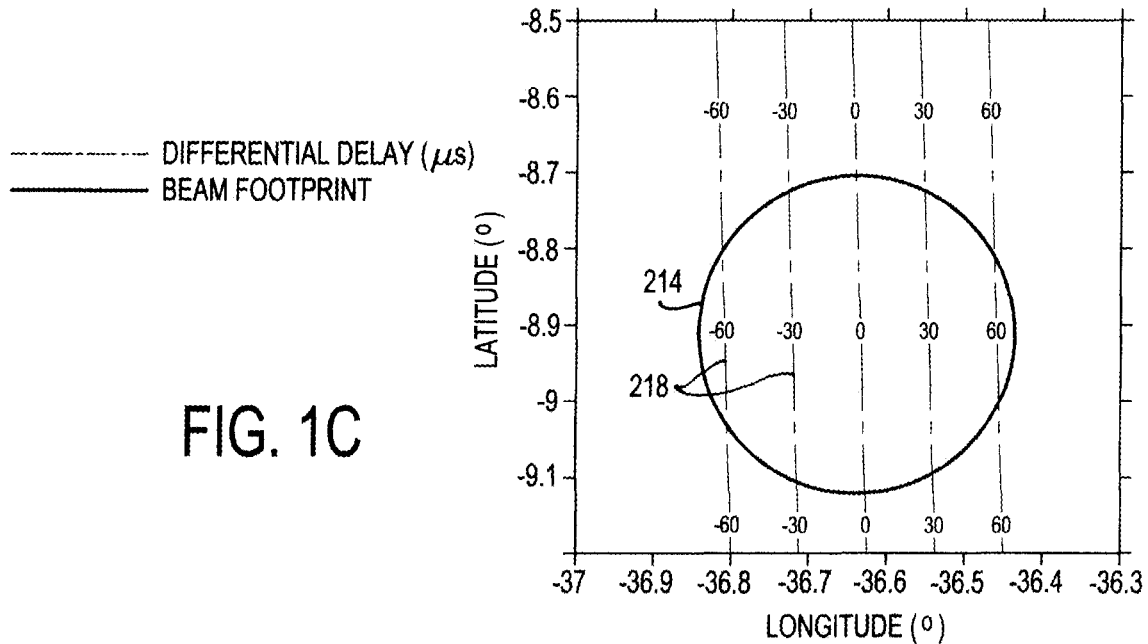
FIG. 1C illustrates differential delays for beam at right edge of satellite FOV after delay normalization.

FIGS. 1A to 1C illustrate delay issue and delay normalization. For simplifying the BTS modification, the minimum delay is normalized to the longest RF path from BTS to the cell center. FIG. 1A illustrates iso-delay contours in satellite field of view (FOV); FIG. 1B illustrates differential delays for central-beam in satellite FOV after delay normalization; and FIG. 1C illustrates differential delays for beam at right edge of satellite FOV after delay normalization.

FIG. 1A shows satellite FOV 211, satellite orbital path 212, and the beams 213, 214, 215 delivered from the satellite and having 45 km diameters, and due to the FOV having dimensions of a few thousands km (shown in latitude and longitude), the amount of RF signal delay from satellite ends up different delay time. The iso-day contours 216 shows the lines where the same delays are. Numbers overlaid on iso-delay contours 216 curves indicate the amount of the delay in the unit of ms (i.e., millisecond). For example, magnitudes of the iso-delay contours 216 are 3 ms, 4 ms, 5 ms, which are outside the scope of 3GPP GSM specs allowed RF delay, and there is no way GSM phone can talk to a standard BTS comply with 3GPP specs in such case. Furthermore, there are other challenges. FIG. 1A presents issues sat GSM faces as follows:

RF delay longer than 3GPP specs defined range (35 km for standard, 120 km for extended).

The RF delay longer than allowed and varies with the beam.

The total RF delay needs to count the feeder link delay. That not only make it much more outside of 3GPP spec, but also make it change with the satellite positions, as feeder link is the link between the GWS and the LEO satellite.

To resolve the issues, two steps or processes can be performed are needed, which includes, step 1, normalizing the delay to make them a constant delay; and step 2, modifying the BTS software (SW) or program instructions to adapt to the constant delay. The BTS can include, for example, one or more processing devices configured to perform functions or processes for BTS, such as to perform functions or processes that are adapted to the constant delay according to the modified BTS software (SW) or modified program instructions. The modified BTS software (SW) or program instructions may be, for example, stored on a memory device of the BTS.

A routing-and-compensating device 10 (FIG. 3) can add various artificial delays to the various RF delays of beams 213, 214 and 215 (e.g., beam centers of beams 213, 214 and 215) to achieve a constant delay for beam centers. For example, 0 ms, 1 ms, and 2 ms artificial delays can be added to beam centers on the three contour lines 216 with delayers of 5 ms, 4 ms, 3 ms, respectively; and accordingly beam centers on the three contour lines 216 can have same delays of 5 ms. The normalized time delay for all the cells in FOV make the delay variation range within the 3GPP spec allowed delay range, and make it possible to address the long RTT issue by simple BTS SW changes.

FIG. 1B illustrates the effect of step 1 on the central beam. FIG. 1B shows differential delay contours 217 for central beam 213 of FOV 211. Since the normalization of the delay time is done or performed to every cell center, the delay that is left for all the cells is the relative delay from any point in the cell to the cell center, which is less than 1 microsecond as shown in the differential delay contours 217 for the central beam 213. FIG. 1C shows differential delay contours 218 for beam 214 at right edge of FOV 211. Differential delays of 217, 218 are both within the 3GPP specs with regard to the delay time range, which is the basic condition to apply 3GPP specs on both BTS and UE. The key points of doing this is to make it possible for simple BTS modification to work with normal GSM phones, via modifying the BTS SW, and turn the normal GSM phones into satellite phones without any modification to normal GSM phones. In certain examples, the BTS SW can be modified to match with or be compatible with the normalized delay.

Making various delay a constant would greatly simplify the changes, and more importantly this enables both BTS and UE satellite transparent. For example, for both BTS and UE being satellite transparent, there is no need for BTS and UE to know which satellite and gateway (e.g., gateway antenna) to connect. In some examples, the effect is that BTS and UE don't even know there are satellite and gateway antenna involved. In some example, timing advance, a standard mechanism to deal with UEs in various position of a cell, can handle the delay variations only up to 70 microseconds.

Delay can be, for example, a function of ephemeris of satellite, GW or GWS positions and earth rotation, and/or cell location; and artificial delays may be introduced or added for delay normalization by a processing device in a routing-and-compensating device 10 (FIG. 3), such as FPGA or ASIC signal processing device that can receive instruction signals from the satellite network (NW) control system (or be under the satellite NW control system supervision) and perform delay normalization in response to the instruction signals, so that normalized delays appear constant to a BTS (such as 12A, 12B in FIG. 3).

The routing-and-compensating device 10 can include, for example, a routing device configured to perform routing, so as to provide right channel signals for two antennas 14A and 14B and BTS (such as 12A and 12B), and/or one or more compensating devices to normalize delay for each beam center and compensate Doppler effect for each beam center dynamically, and provide the normalized delays and compensated frequencies to the respective BTS. The one or more compensating devices may include, for example, one or more processing devices.

Each UE (or MS) has different delay, such variations at off-center locations that are off-center with respect to cell centers are small (e.g., of the order of roaming in a smaller—23 km—terrestrial cell—well within 3GPP spec defined working range.)

Figure 2A:
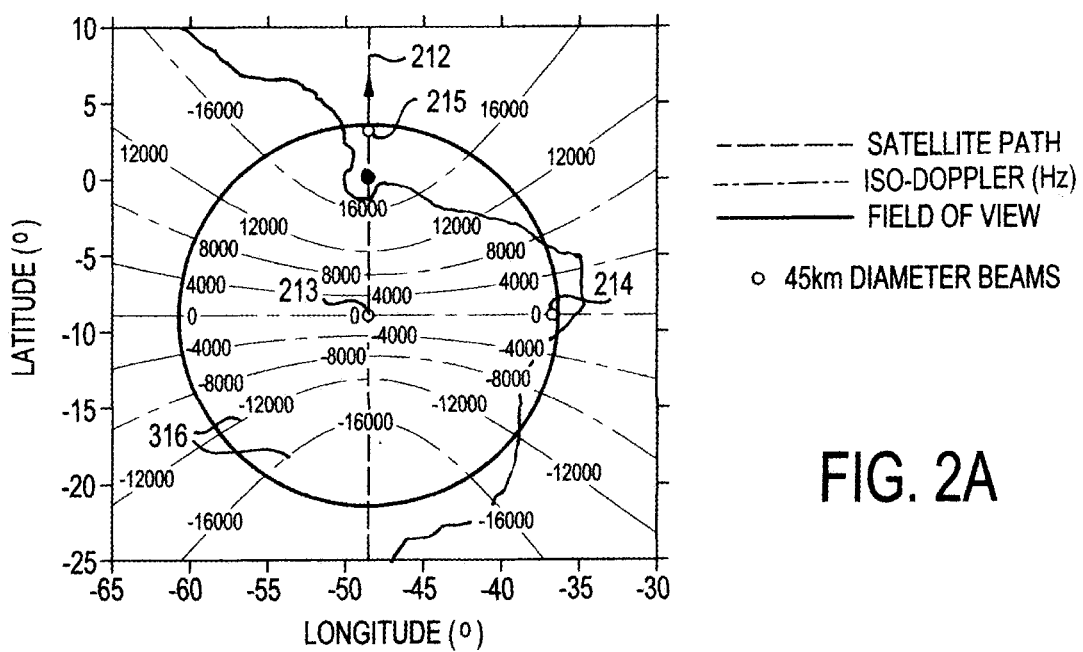
FIG. 2A is a diagram showing the Doppler issue.

FIG. 2A shows another sat RAN challenge—Doppler effect well above 3GPP specified limit. FIG. 2A illustrates the Doppler issue as a result of LEO sat orbiting at the speed of 7.5 km/s. The iso-Doppler contour lines 316 are the lines where Doppler effect causes the same frequency offsets—shown as a number on the lines—which are too larger for UE to handle, as they are well beyond specs allowed range, and there are additional Doppler shift on the feeder link. The frequency offset of iso-Doppler contours 316 is the Doppler effect on the service link only and the iso-Doppler of iso-Doppler contours 316 is more than 12000 Hz, while 3GPP assumed Doppler shift is of a few hundred Hz. The sat RAN Doppler compensation mechanism is to compensate the beam with the frequency offset (e.g., to the cell center) so as to bring the Doppler effect into the 3GPP allowed range.

Figure 2B:
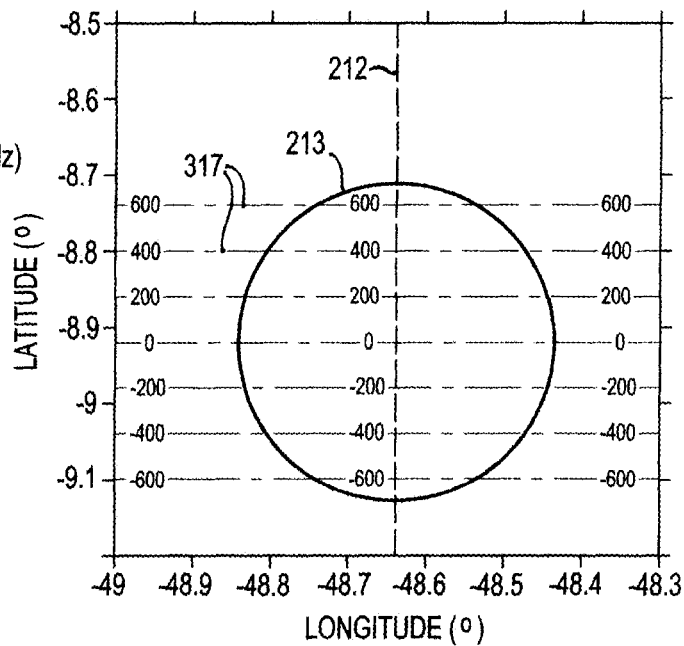
FIG. 2B is a diagram of the Doppler compensation result for the cell in the center of Field of View (FoV)

FIG. 2B illustrates a diagram of the Doppler compensation result for the cell in a central beam 213 that is at a center of FoV 211, which shows an example solution that enables UE to work. Differential Doppler of differential Doppler contours 317 have values less than 700 Hz. Differential Doppler (e.g., of differential Doppler contours 317) is the residual Doppler frequency offset after the Doppler compensation on the beam center (or cell center), where 0 Hz is indicated. With the Doppler compensation, the beam center (or cell center) has 0 Doppler offset. Away from each beam center, residual Doppler offset (or differential Doppler that is the difference with respect to the beam center) becomes larger as UE moves to the beam edge or cell edge in most cases, but none are above 3GPP assumed Doppler range after the Doppler compensation. So again, the approach brings the sat RAN use case back to the 3GPP specs where sat GSM can directly talk to normal GSM UEs.

Figure 2C:
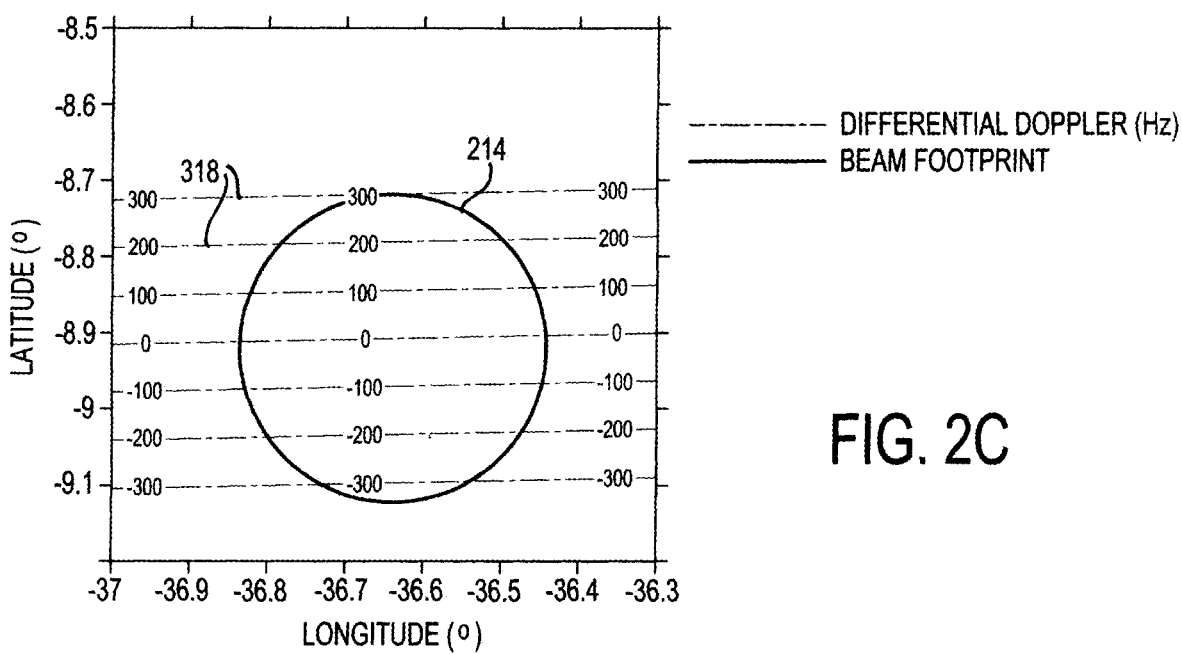
FIG. 2C is a diagram of the Doppler compensation result for the cell in the edge of FoV.

FIG. 2C is a diagram of the Doppler compensation result for the cell 214 at the edge of FoV 211, where the residual Doppler effect is well within the GSM UE capability defined in GSM specs. Differential Doppler of differential Doppler contours 318 have values less than 400 Hz, and accordingly GSM UEs in the cell 214 can handle that by 3GPP specs.

The Doppler compensation may be performed by one or more processing devices of the routing-and-compensating device 10, such as FPGA or ASIC signal processing device. In some examples, Doppler pre-compensation is performed on DL, and post-compensation is performed on UL, by the one or more processing devices of routing-and-compensating device 10, according to satellite ephemeris and latitude-longitude-altitude (i.e., lat-lon-alt) of gateway antenna of the GWS 31 and the cell location. The pre-compensation is the process adding the opposite frequency offset before Doppler effect occurs, and post-compensation is the process adding the opposite frequency offset after Doppler effect occurs.

Doppler effect is related to the speed, direction angle changes and/or relative positions. So over the satellite path (or a period that pass over a UE), Doppler effect can be different naturally. The Doppler compensation (such as pre-compensation, post-compensation) can compensate Doppler variation during satellite pass, dynamically.

In some examples, the abrupt Doppler shift during handover can be compensated by one or more processing devices of the routing-and-compensating device 10 to be within the GSM spec, as the compensation details can be pre-arranged or pre-configured, before the satellite pass.

The pre-compensation is on a beam-to-beam basis and is based on beam-center coordinates (lat-lon). Small residual Doppler left based on UE position are within GSM spec.

To enable satellite mobility, the present disclosure provides a method of performing BHO in the satcom system. FIG. 3 illustrates LEO satcom FoV and the overlapping situation where beam handover (BHO) happens. FIG. 3 shows a gateway site (GWS) 31 in accordance with one embodiment of the present disclosure. The gateway site (GWS) 31 includes routing-and-compensating device 10, directional gateway antennas 14A and 14B, and a plurality of BTSs (e.g., eNodeBs or processing devices) 12A and 12B. The GWS 31 is in communication with user equipment (UE) 30 via a setting satellite 20A and a rising satellite 20B. The satellites 20A, 20B communicate with the UEs (such as 30) over a respective setting TRx beams 16 and rising TRx beams 17. UEs can be in an idle state and those idle UEs may only monitor the cells and carry out cell reselection and tracking area update when needed (e.g., for paging), there is no need for the BTSs to take care of them in beam or satellite handover (BHO). The BHO takes care of the active UEs only. The active UEs are or include the UEs in a call, and need BTS dedicated control to move from setting satellite beam to the rising satellite beam. The routing-and-compensating device 10, via antennas 14A and 14B, communicates with the satellites 20A, 20B over a respective outband beam 14, 15.

The satellites 20A, 20B have RAN (radio access network) signal FoV 50A, 50B on the Earth surface, respectively. The setting satellite 20A has a setting FoV 50A, and can communicate with UEs directly (e.g., without a ground cell tower and without any modification to the normal GSM UEs or phones) in their cells 51 in FoV 50A with serving beams on DL and UL. The rising satellite 20B has a rising FoV 50B, and can communicate with UEs directly (e.g., without a ground cell tower and without any modification to the normal GSM UEs or phones) in their cells 52 in FoV 50B with serving beams on DL and UL. The setting and rising FOVs 50A and 50B overlap (or at least partially overlap) in the overlapping area 50AB. The setting satellite 20A is setting, i.e., leaving the current footprint 50A for the ground station antenna 14A, and the rising satellite 20B is rising or ascending, serving the footprint 50B for the ground station antenna 14B. In accordance with one embodiment, BHO occurs for the cells 51h located inside the overlapping FOV area 50AB.

Satellites 20A, 20B are linked to the routing-and-compensating device 10, via gateway antennas 14A, 14B. The processing devices of BTS 12A, 12B control communication with the UEs via the satellites 20A, 20B on the GSM control channel (see FIG. 1 of the GSM Specification). The satellite communication system 5 includes a ground station or GWS 31, and GWS 31 contains a farm (such as an eNodeB or BTS farm) 3 and routing-and-compensating device 10 that communicate over two satellites 20A, 20B via the antennas 14A and 14B. There may be multiple UEs 30 in a beam HO cells 51h in the satellite overlapping area 50AB (here, overlapping ground cells are labelled as 51h and non-overlapping cells are labelled 51 52. Soon cells 51 is to be changed to 52 as the satellites orbit around the earth along path or orbit 22). When UEs 30 are in a beam HO cell 51h, UEs 30 can be more specifically referred to as "UEs 30h".

The first satellite 20A is setting, i.e., leaving the current footprint 50A for the ground station antenna 14A, and the second satellite 20B is rising or ascending, serving the footprint 50B for the ground station antenna 14B.

The cells 51h in the overlapping area 50AB go through a satellite beam handover (BHO) for active UEs in HO cells 51h, e.g., in one or more HO cells 51h. That is, as the cells 51 enter the overlapping area 50AB, a satellite beam handover process is triggered to switch communication for those overlapping cells 51h from the setting satellite beams 16h to the rising satellite beams 17h. It is noted that beams 16h and 17h are slightly different from other beams of 16 and 17, as beams 16h and 17h are from the same BTS 12A in BHO, which used to be associated with the setting satellite 20A, but in beam HO (BHO), the BTS 12A is associated with both setting and rising satellites 20A and 20B. The beam 16h keeps the same as beam 16, keeping the base-station-colour-code (BCC) 13A(1); however its top priority is not on data traffic, but the active UEs HO to beam 17h which is newly started by the same BTS 12A on another RF port 12A(2) with a different BCC 13A(2) via rising satellite 20B. Beam 17h is newly added to the rising satellite beams and 16h and 17h coexist for the BHO period. Hence the BHO only happens in satellites' overlapping cells 51h of the setting satellite 20A and the rising satellite 20B. The HO beam 17h keeps the same configuration for user traffic and becomes one of the beams 17.

FIG. 3 shows a cell's BTS 12A with two RF ports 12A(1) and 12A(2), which delivers the DL and UL signals through two GW antennas 14A and 14 B that serve two satellites 20A and 20 B, where each baseband unit (BBU) of a cell provides a beam signal for HO service link 16h/17h via feeder link 14/15 for two TRx paths to the two RF ports 12A(1) and 12A(2) on the BTS 12A. The newly added beam 17h starts with the target GW antenna 14B with a thin line interface 1214B. Further, after the BHO and when beam 17h becomes one of the beam 17, the BHO cell is packed with the current cells in 50B, and becomes corresponding to the BTS 12B, and feed to gateway antenna 14B interface in the IQ stream, and such signal is handed over from 12A to 12B on BTS and from 14A to 14B on the GW antenna, and from feeder link 14 to 15 to achieve BHO from sat 20A to 20B. Then the data for the BHO cell is no long needed from satellite 20A and will come from 20B. This can be treated as 2 cell HO as well. Note that no extra hardware is needed, as by default there are two RF ports for each cell and BHO can just borrow one of them for short period of time, assuming the initial sat RAN of providing coverage on global scale uses 1T1R to save feeder link bandwidth. In MIMO operation, one port can be temporarily used for BHO. In some examples, the satellite GSM system can enable the RF condition of UE to achieve synchronized handover by the two beams from two satellites overlapping on to the same handover cells.

In operation, the cells 51, 52 in the FOV of each satellite 20A, 20B communicate with a respective BTS 12A, 12B over a designated RF port. Specifically, the cells 51 in the FoV 50A for the setting satellite 20A communicate over a first beam 16 via the setting satellite 20A. The setting satellite 20A communicates with one or more first BTS (e.g., eNodeBs) 12A of cluster 12CA at the gateway site 31 over a primary RF Transmit/Receive (TRx) port 12A(1), via the first GW antenna 14A. And the cells 52 in the FOV 50B for the rising satellite 20B communicate over a second beam 17 via the rising satellite 20B. And the rising satellite 20B communicates with one or more second BTS (e.g., eNodeBs) 12B of cluster 12(CB) over a primary RF TRx port 12B(1), via the second antenna 14B. Each BTS may communicate with a single cell 51, 52.

A smooth and seamless BHO is triggered as cells enter the overlapping region 50AB. In the beam HO moment, the two RF ports (such as 12A(1) and 12B(1)) are utilized separately, but for simplicity we just illustrate SIMO (Single Input Multiple Output) configuration for both satellites. Cells 51, 52 in non-overlapping areas are using just one of the two RF TRx ports 12A(1), 12B(1), and each footprint has their own beams 16, 17 for normal user data traffic operation. BTS 12B has primary RF TRx port 12B(1) with first BCC 13B(1) and secondary RF TRx port 12B(2) with second BCC 13B(2).

Figure 6:
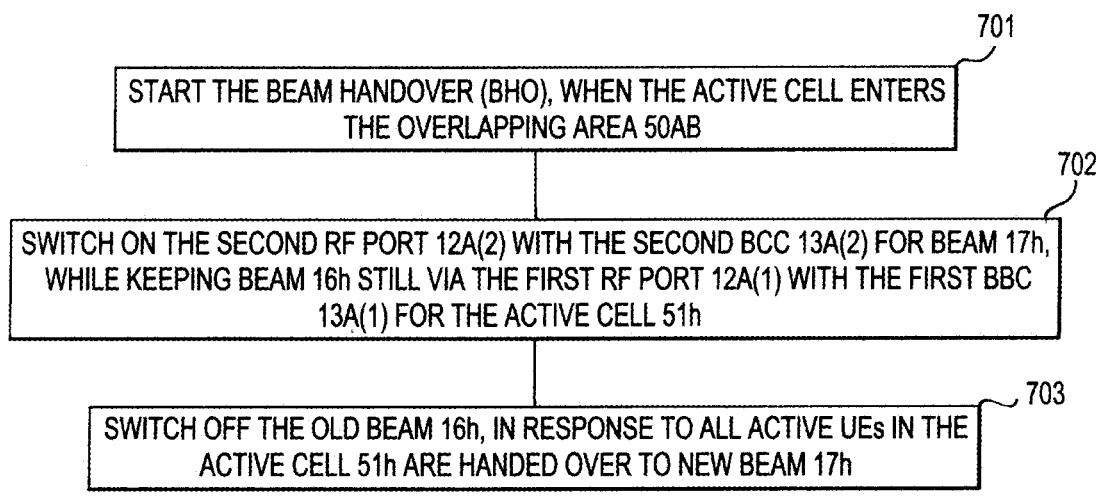
FIG. 6 illustrate an example beam handover process.

FIG. 6 illustrate an example beam handover process. Referring to both FIGS. 3 and 6, when the active cell 51 enters the overlapping area 50AB, the satcom system tells (or instructs) the BTS (e.g., eNodeB) to start the BHO (701 of FIG. 6). For example, the BTS may start the BHO, in response to receiving a start BHO instruction signal sent from the satcom system when the active cell enters the overlapping area 50AB. When the cells 51 are in the overlapping area 50AB, the BHO is ON and the cells 51 become BHO cells 51h, beams 16 become beams 16 h, and UEs 30 become UE 30h. BHO happens in the overlapping area 50AB. The process of moving all the active UEs from setting satellite beam 16 to the rising satellite beam 17 is started.

The BTS 12A switch on the second RF port 12A(2) with the second BCC 13A(2) for beam 17h, while keeping beam 16h still via the first RF port 12A(1) with the first BCC 13A(1) (702 of FIG. 6). The source beam 16h and target beam 17h are overlaid on the same physical cell 51h, fixed on the ground, with two different BCCs 13A(1) and 13A(2), respectively. Therefore, UEs 30h in cell 51h can recognize beams 16h and 17h as corresponding to two different cells, and satellites BHO can be realized by using the BCCs, alternatively. The BTS's two RF ports 12A(1), 12A(2) deliver the ping-pong BBCs to the cell 51h via two RF paths 16h, 17h and two satellites 20A, 20B.

In response to that all active UEs in the active cell 51h are handed over to new beam 17h, the BTS 12A (e.g., eNodeB or baseband unit (BBU) of BTS) behind the two overlapping beams 16h and 17h switches off (or controls to switch off) the old beam 16h (703 of FIG. 6), as there is no need to keep or have the old beam 16h for the active UEs in the active cell 51h. Once BTS 12A communicates over the secondary port 12A(2) via the second antenna 14B and the rising satellite 20B to the active UEs 30h in cell 51h, BTS 12A ceases communication over the primary port 12A(1) and the first antenna 14A to the active UEs 30h in cell 51h, and the cell 51h can continue to communicate with the BTS 12A over the secondary RF port 12A(2) and the second antenna 14B, where the respective BTS (e.g., eNodeB or BBU) 12A of cluster 12CA may become or be taken as BTS (e.g., eNodeB or BBU) 12B of cluster 12CB, and the respective secondary RF port 12A(2) and BCC 13A(2) of the BTS 12A of cluster 12CA may become or be taken as the primary RF port 12B(1) and BCC 13B(1) of the BTS 12B of cluster 12CB.

The coexisting beams 16h and 17h from two RF ports 12A(1) and 12A(2) via two GW antennas 14A, 14B and two satellites 20A and 20B can improve the reliability of the BHO. BTS 12A switches off beam 16h only when beam 17h has taken over, and further BHO may not change BTS (e.g., eNodeB or BBU of BTS) for the cell, so all the active UEs context are kept and seamlessly take effect as needed, as it is the same BTS before and after BHO. After the BHO, beam 17h becomes 17, UEs 30h are back to generic UEs 30 until the next BHO.

For more details of BHO, references can be made to U.S. patent application Ser. No. 17/583,992, noting that physical cell ID (PCI) used in LTE scenarios is replaced with BCC for GSM scenarios. For example, PCI 13A(1) can be replaced with BCC 13A(1), PCI 13A(2) can be replaced with BCC 13A(2), PCI 13B(1) can be replaced with BCC 13B(1), and PCI 13B(2) can be replaced with BCC 13B(2).

Figure 4A:
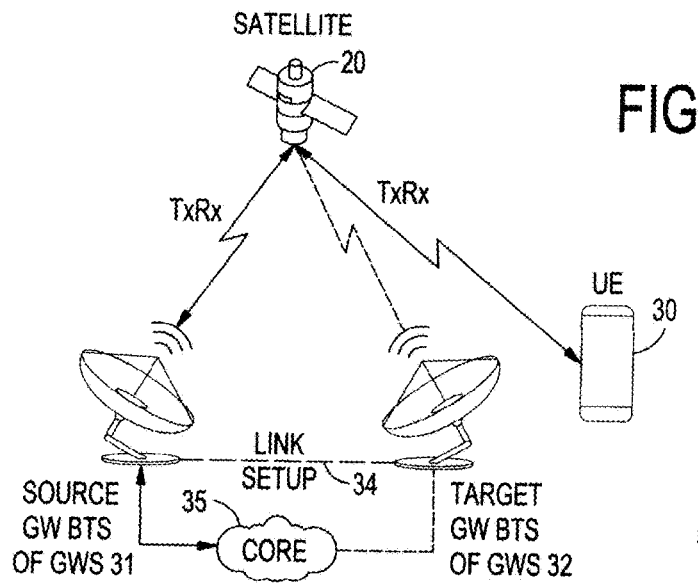
FIGS. 4A, 4B, 4C are block diagrams showing Gateways interconnectivity link.
Figure 4B:
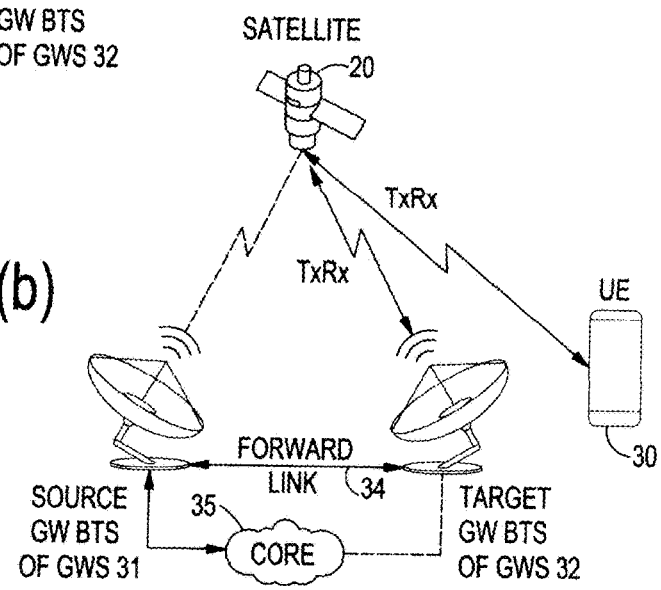
Figure 4C:
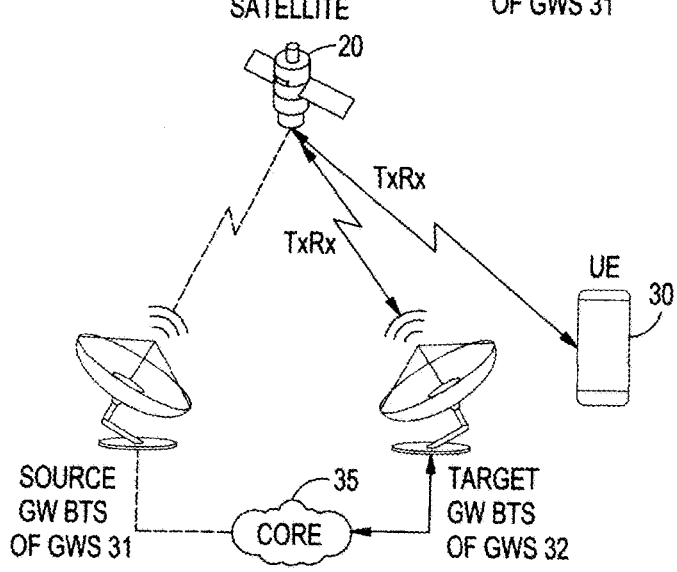

FIGS. 4A, 4B, 4C illustrate gateways interconnectivity link. Certain gateways may be hundreds to over 1000 km apart and addressing the UE mobility between cells that have their serving BTSs on different gateway sites (such as different gateway sites 31, 32).

FIGS. 4A, 4B, 4C illustrate an example gateway handover (GHO) for UE mobility from cell 51 to cell 53 (as shown in FIG. 3). The GHO may has three phases: preparation (FIG. 4A), execution (FIG. 4B), and completion (FIG. 4C).

During the preparation phase (FIG. 4A), the UE 30 is connected to the source GW BTS in GWS 31 and from there to the core network 35. In some examples, the core network 35 is formed by multiple nodes, which offer multiple functionality such as mobility management, authentication, session management, setting up bearers and application of different Quality of Services. At some point, when UE 30 moves to cell 53 whose target GW BTS is in a different GWS 32, the target GW BTS receives a handover notification of beam HO, the target GW BTS can receive the timing of the new comer and knowing exactly the UE and the active service, so that the core network reroute its traffic to the right BTS. During the execution phase (FIG. 4B), the UE 30 is connected to the target GW BTS in GWS 32 but the traffic is routed via the gateway interconnection link (forward link) 34 to the source GW BTS in of GWS 31 and then the core network 35. Finally, at the completion phase (FIG. 4C), the UE 30 is connected to the target GW BTS of GWS 32 and from there to the core network 35. Thus, communication between the satellite 20 and the core network 35 is originally through the source GW BTS in source GWS 31, and transferred to the target GW BTS in GWS 32.

Figure 5:
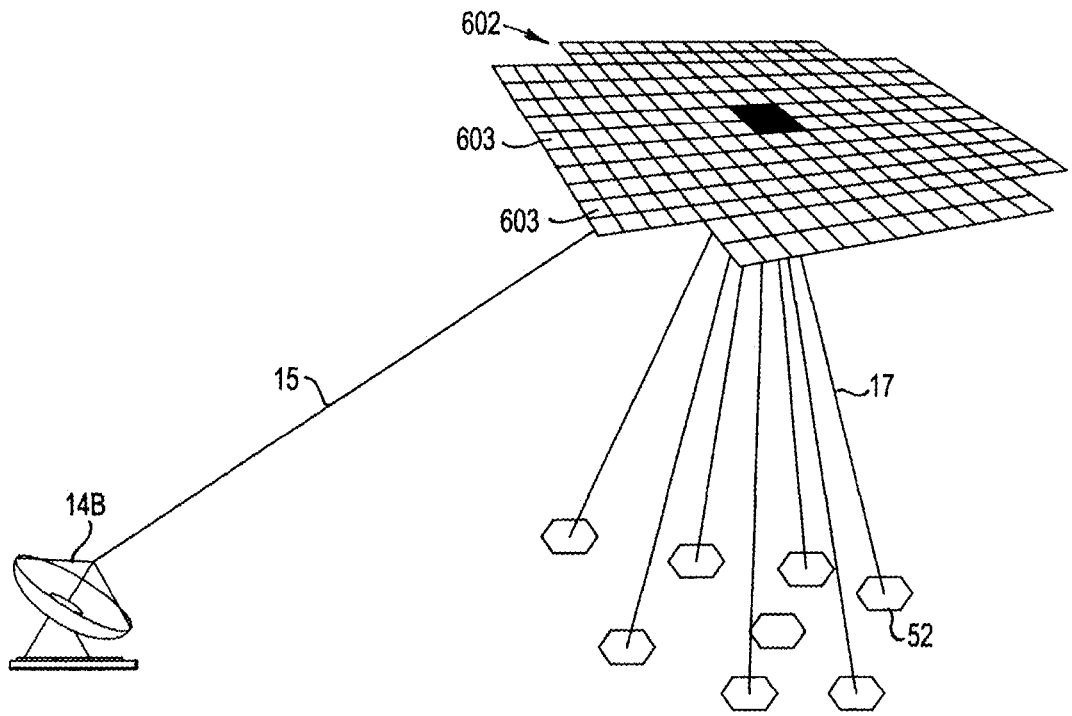
FIG. 5 illustrates an example large phase array antenna.

FIG. 5 shows an example build-in large phase array satellite 602. The phase array satellite 602 includes a plurality of phase array antenna elements 603 that form a plurality of (e.g., hundreds of) beams 17 which are electronically steerable to provide continuous services to the fixed cells on the ground. The feeder link 15 from GWS tracking dish 14B is providing the DL and UL mechanism between the satellite and the GWS, and the satellite is capable of talking to a number of GWSs at the same time. Satellites 20A, 20B can each be (or include), for example, the large phase array satellite 602.

The first challenge of satcom technology talking to GSM UEs (or MSs) is to provide cells just like terrestrial network (TN) deployment as the GSM UE knows it, as the mobility, paging and location area are all cell based. Although satcom avoids the need of infrastructure and equipment like towers, antennas on the ground, the BTS is still needed in the BTS farm on gateway site to provide beams from satellite for cells 51 and 52 under FOV of satellites 20A, 20B, as shown in FIG. 3, for un-modified UE (or un-modified MS) to perform or operate.

Example first innovative solutions of the satcom GSM to the first challenge are described as follow.

In some examples, ground gateway sites (GWSs), such as GWS 31 shown in FIG. 3 and other GWSs, are distributed around the earth, and can control enough number of satellites whose FOVs 50A, 50B cover the earth surface.

In certain examples, each satellite 20A or 20B has large enough number of phase array antenna elements (such as antenna elements 603), which have enough elements to form a few hundreds beams for Tx and Rx to serve many cells in satellite FoV on the Earth surface; as satellites pass the cells 51, 52, each cell gets a serving beam, and satellites are tracking the cells during their passes or paths (22) over each ground cell.

In another example, there are enough satellites orbiting in LEO and distributed in multiple orbital planes to cover the whole earth surface in dynamic fashion. Setting satellites (such as 20A) can handover the services to rising satellites (such as 20B) smoothly without interruption.

GWS (such as 31) can then send the many DL signals to the satellites with specific packing order to let satellites arrange the beams and deliver them to the pre-arrange fixed cells, where many beams are formed for delivery of each DL for the cells.

With the same phase arrays (or the same phase array antenna elements), the Rx beams for each cell can be formed and each cell's UL signals are received in the similar way for BTS (such as 12A, 12B).

To enable satcom to work with un-modified GSM phones, modifications are required on the BTS side specially to handle the additional latency caused by the long RF path of feeder link and service link of 700 km LEO orbit, compared to its normal operation working with a tower at no more than 10 Km.

The second challenge is the latency caused by the distance between GWS-satellites-UE, where the latency may be about 5 to 16 ms, and changing dynamically as satellite flies over the cells as indicated by FIG. 1A. Such a factor can be difficult for BTS and UE to handle, as BTS and UE would not assume satellites would be involved at any stage at any time. The problems are that (1) BTS and UE do not know where the satellites are at any moment, and (2) such variations would disturb the frame structure of GSM as shown in FIG. 1 of the GSM Specification.

Example second innovative solutions to the second challenge can include getting the longest RF path latency and count the delay of various factors, including but not limited to the following.

Information about each satellite and earth cell, such as their position (Latitude, Longitude, height) are well captured and fully under GWS control.

BTSs (Such as 12A, 12B) generate the DL signals in IQ form and pass them to routing-and-compensating device 10 and antennas 14A and 14B to pass them to serving satellites (such as 20A, 20B), and serving satellites pass them to UEs in respective cells (such as 51, 52). UL signals come back from UEs in cells (such as 51, 52) to serving satellites (such as 20A, 20B), and to antennas 14A and 14B and the routing-and-compensating device 10, and further to BTSs (Such as 12A, 12B).

In some examples, according to the beam's position, different amount of artificial delay is introduced, and the delay is normalized by a delay and doppler compensator of routing-and-compensating device 10, using complex unit with the required phase to produce the product on each IQ, so as to have constant delay and expected frequency observed by BTS (such as 12A, 12B). For example, depending on the position of the satellite (such as 21A, 20B) and position (e.g., elevation from the ground) of GW antenna (such as 14A, 14B) of GWS 31 and UE, the latency or delay can vary. Artificial delay can be added, such that the compensated or normalized delay has the same value (or approximately same value) as seen by the BTS (such as 12A, 12B), regardless of satellite position. Then the constant delay can be handled by BTS software (SW) modifications, so that the delay issue is simplified and BTS does not need to consider where the satellite is on LEO. All the BTSs can work in the same or similar way regardless where satellites are. The residual delay differences are small and within spec defined range as shown in FIGS. 1B and 1C.

The residual timing differences can be handled with the normal timing advance (TA) control of BTS (such as 12A, 12B), because the residual timing differences are within the tolerance of the BTS. Accordingly, the implementation is simplified and the signal processing is streamlined.

In some examples, for a cell size of 48 km, since the normal 3GPP TA range are for (or correspond to) up to 35 km, an elevation angle of a cos(35/48)=43.183° can make the beam differential TA in 35 km for 48 km cell size, where the elevation angle is an angle between ground and the beam from the satellite to the cell. For an elevation angle larger than 43.183°, the beam differential TA is still within the normal 3GPP TA range. For an elevation angle smaller than 43.183°, an extended TA range needs to be used. The normal 3GPP relevant RAT TA range and/or the extended TA (for GSM) range can be used by BTS (such as 12A, 12B).

The amount of delay may be configured by delay compensator of the routing-and-compensating device 10, e.g., by FPGA processing device and memory holding the IQ signals for the required amount of time, so that UE at each cell center has a mid TA value, which is a midpoint value of a range of TA value, such as a 3GPP TA range.

For Sync mechanism of the system, DL/UL follow the GPS Clock and is sync to UTC as LTE does (as performed or controlled by BTS).

In some example, changes are made to BTS to accommodate the gateway-satellite-UE long RF path delay (as normal DL and UL would be kept as 3 time slots as usual). One of the required change is in the timers. The BTS's timer is set, such that the BTS may set a longer gap from the Tx to the expected Rx signal from UE UL, e.g. 41.5 ms+3 timeslot period. In some examples, a one-way gap may be 20 ms.

With the fixed latency (a few GSM frames), the extra long RACH delay can be further handled, where BTS (such as 12A, 12B) may waste (or skip) first a few RACHs and respond to the later ones. GSM timer on BTS side for receiving the RACH can be set long enough so that there is no problem. The good thing about GSM RACH for satcom GSM is that they start with the strongest power level so that satellites would not miss them. In some examples, the power level may be 30 dBm. Accordingly, the satellites (such as 20A, 20B) are able to hear the RACH and respond within the period of timer setting (e.g., 15 seconds).

The third challenge is the Doppler effect due to the satellite speed of 7 km/sec to 8 km/sec as shown in FIG. 2A.

The GWSs (such as 31) can be configured to compensate the Doppler effect for the DL and UL signals for each cell location as shown in FIGS. 2B and 2C. The delay and doppler compensator device of the routing-and-compensating device 10 can be used for this purpose. The residual Doppler effect can be, for example, within +/−600 Hz. The residual Doppler effect is well within GSM spec, so that both normal GSM UE and BTS can work smoothly.

On the return journey for UE UL signals, GWS can do the same (or similarly) for BTS DL signal in Doppler effect compensation and delay normalization.

The fourth challenge is the handling of USF. In TN deployment, BTS would expect the UL Tx on the very next frame, but for the long RF path in satcom case, it will take much longer time. Thus, on packet data for GPRS/EGPRS, we can modify the BTS software to expect the UL signal with the extra normalized delay time. Such change can properly adjust the RTT latency issue here. In certain example, the BTS software can be modified to expect the UL signal with the extra normalized delay time, so as to match with or be compatible with the extra normalized delay time.

The fifth challenge is the beam tracking of ground cells, beam handover from satellite to satellite and gateway handover. This is due to low earth orbit (LEO) satellites are rotating around the earth and earth self-rotation. The solution is a combination of below build-in capabilities in the satcom GSM system.

The satellites (such as 20A, 20B) can include massive phase array (or phase array antenna elements) with beamforming capability dynamically steering the beams as the relative position between the ground cells and their serving satellites changes, so the cells being served are tracked as long as the cells are in the FOV of satellites.

Satellites' FoV (e.g., 50A, 50B) overlap among themselves in overlap areas (such as 50AB) to cover the area being served, leaving no gap on the ground where services are needed.

When a cell is shifting out of FoV 50A of the setting satellite 20A, it is also entering FOV 50B of the rising satellite 20B. Beam handover between two satellites 20A, 20B is performed during the cell is in the overlapping area 50AB of the two satellites 20A, 20B.

Each BTS has two BCCs, 13A(1) and 13A(2), as shown in FIG. 3, assigned to the two BTS RF ports, 12A(1) and 12A(2), respectively, and each BTS RF port is streaming the IQ baseband signal with the routing-and-compensating device 10 serving the two satellites 20A and 20B, and the two satellites 20A and 20B have overlap FOV area 50AB that the beam handover cell 51h is in. The two beams 16h and 17h are overlayed on the same cell and the BTS would initiate the beam HO and tell UE to find rising satellite beam to the cell with another BCC, which is the one the BTS generated for the rising satellite.

After taking the measurement report from the UE in the overlapping area of the setting and rising satellites 20A and 20B, the BTS can use the rising satellite 20B to continue the service to the UE. Beam HO is accomplished seamlessly.

Referring to FIG. 4, the gateway handover is performed with the proper gateway placement, so that one satellite is able to see two GWs (such as GWs of GWSs 31 and 32 shown in FIG. 4) while its FoV has cells served by the two gateways (e.g., two GW antennas). There are enough transponders on satellite that can talk to the relevant GWs while satellite needs to serve their cells. GW handover is accomplished as the satellites pass the cells.

Core NW support to the GW/BTS are assumed (or provided) for CS and PS services, just like TN deployment. The GW HO (i.e. GHO) can go through three phases as shown in FIG. 4 and associated text. The timing and procedures are similar to TN, and able to cover longer distance via forward links 34 (such as fiber links).

The 6th challenge is the UE mobility support, where cell handover between two cells whose BTS are in two gateway sites far away from each other (e.g. 1000 km away). Although this is a standard feature of GSM specs, the enabling mechanism in satcom need specific inter gateway links as shown in FIG. 4. The HO involved 3 phases of setup from control channel to the traffic and clearing down the extra link after the HO. These phases involve the satcom radio innovative approaches as described above (such as approaches to address the first to fifth challenges) to enable 3GPP HO protocols running in between the sites and entities as protocols do in TN deployment. Some timers need to be tuned to accommodate RTT 40 ms. For example, in 2G, most of timers are set to 5 to 15 seconds, therefore there is good tolerance to long delay introduced by GWs and satellites.

In the present disclosure, with the resolutions and improvements in BTS/Core network, satcom GSM can directly talk to commercial GSM UEs for voice and data call.

In certain examples, in the satellite communication system of present disclosure, gateway placement is such that the satellites serving cells of the gateways have the line of sight (LOS) to the gateways for smooth GW HO.

Thus, the present disclosure provides a GSM satellite communication system 5 in communication with a first satellite 20A having a first field of view 50A including a first plurality of cells 51 in which a first plurality of UE 30 are located. The UE 30 are in direct communication with the first satellite 20A. The system 5 includes a first feeder link 14 and a first tracking antenna 14A configured to communicate with the plurality of active UEs 30 via the first satellite 20A directly serving the first plurality of cells 51. The system 5 also has a first BTS 12A (e.g., a first processing device) configured to communicate with the plurality of active UEs 30; a routing-and-compensating device (e.g., a second processing device) configured to normalize delay for a plurality of beam centers of the first plurality of cells 51, and provide the normalized delay to the first BTS 12A. The routing-and-compensating device 10 can enable the BTS 12A to tolerate communications with UE 30 via the first satellite 20A, by normalizing delays and compensating Doppler effect and providing normalized delays and compensated frequencies to BTS 12. In the present disclosure, residual timing differences within a cell 51 can be handled with the normal timing advance (TA) control of BTS 12A, because the residual timing differences after the delay normalization are within the tolerance of the BTS 12A. The advantage of the sat RAN design is to make the sat RAN two technology transparent to each other, i.e. the BTS (or eNB and gNB) and UE do not need to manage which satellite and gateway they need to talk to, while satellite technology does not need to manage the RAN details, but the provision of the RF condition as a communication condition. The physical enabling mechanism for the direct link between the satellites and UEs is or includes the large enough phase array on the satellite. BTS and UE just perform their modem operation as normal, provided BTS (or eNB and gNB) has the modifications needed to handle long RTT for tens of milliseconds.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

What is claimed is:

1. A GSM (Global-System-for-Mobiles) satellite communication system in communication with a first satellite having a first field of view including a first plurality of cells in which a plurality of active User Equipment (UEs) are located, the plurality of active UEs being in direct communication with the first satellite, the satellite communication system comprising:
a first feeder link and a first tracking antenna configured to communicate with the plurality of active UEs via the first satellite directly serving the first plurality of cells;
a first processing device configured to communicate with the plurality of active UEs; and
a second processing device configured to normalize delay for a plurality of beam centers of the first plurality of cells, and provide the normalized delay to the first processing device;
wherein when an elevation angle between ground and a beam from the first satellite to a cell of the first plurality of cells is equal to or larger than a threshold value of 43.183 degrees, said first processing device communicates with the plurality of active UEs using a normal 3GPP timing advance range, and
when the elevation angle is smaller than the threshold value, said first processing device communicates with the plurality of active UEs using an extended timing advance range.

2. The GSM satellite communication system of claim 1, wherein the second processing device is further configured to perform Doppler compensation for the plurality of beam centers of the first plurality of cells, and provide compensated frequencies to the first processing device.

3. The GSM satellite communication system of claim 1, wherein:
timing advance of the UE at a beam center of the plurality of beam centers has a midpoint value of a range of timing advance with the normalized delay.

4. The GSM satellite communication system of claim 1, wherein:
the first processing device is a processing device of a GSM base transceiver station; and
the second processing device is configured to normalize delay for beam centers of the first plurality of cells according to a GSM frame structure.

5. The GSM satellite communication system of claim 1, wherein:
the first processing device is configured to adjust expected receiving timing and set a timer according to the normalized delay.

6. The GSM satellite communication system of claim 1, wherein the first satellite includes a plurality of phase array antenna elements configured to form a plurality of beams for the first plurality of cells.

7. The GSM satellite communication system of claim 1, wherein the first satellite is configured to track the first plurality of cells when the first satellite passes over the first plurality of cells.

8. The GSM satellite communication system of claim 1, wherein:
the first processing device is a processing device of a GSM base transceiver station; and
the first processing device is connected to a core network.

9. The GSM satellite communication system of claim 1, wherein:
the first tracking antenna is in a first gateway site;
the GSM satellite communication system further comprising:
a second gateway site; and
a fiber link between the first and second gateway sites.

10. The GSM satellite communication system of claim 1, wherein:
the first processing device is a processing device of a GSM base transceiver station; and
the first satellite is transparent to the GSM base transceiver and unmodified standard 3GPP compliant UEs and is configured to communicate with a modified base-station low PHY of the GSM base transceiver and the unmodified standard 3GPP compliant UEs.

11. The GSM satellite communication system of claim 1, wherein:
the first satellite is a first setting satellite; and
the GSM satellite communication system is in communication with a second rising satellite having a second field of view, the first setting satellite and the second rising satellite having an overlapping field of view where the first field of view overlaps with the second field of view, and an overlapping plurality of cells being located in the overlapping field of view;
the GSM satellite communication system further comprising:
a second feeder link and a second tracking antenna configured to communicate with the second rising satellite serving a plurality of active UEs directly in a second plurality of cells; and
the first processing device is further configured to control the plurality of active UEs to communicate directly with the second rising satellite.

12. The GSM satellite communication system of claim 11, wherein:
the first processing device is configured to start or end beam handover in response to an instruction signal.

13. The GSM satellite communication system of claim 11, wherein:
the plurality of active UEs in the first field of view communicate directly with the first setting satellite over a plurality of first service link beams; and
the plurality of active UEs in the second field of view communicate directly with the second rising satellite over a plurality of second service link beams.

14. The GSM satellite communication system of claim 13, wherein:
the first antenna communicates with the first setting satellite over a first feeder link; and
the second antenna communicates with the second rising satellite over a second feeder link.

15. The GSM satellite communication system of claim 14, wherein the first processing device is further configured to control the active UE to cease communicating with the first setting satellite.

16. The GSM satellite communication system of claim 14, wherein the first antenna stops communicating with the first setting satellite.

17. The GSM satellite communication system of claim 11, wherein the first processing device is configured to:
communicate with the active UE in the overlapping field of view with a first base-station-colour-code (BCC) and via the first setting satellite; and
communicate with the active UE in the overlapping field of view with a second BCC and via the second rising satellite, when the active UE becomes in the overlapping field of view.

18. The GSM satellite communication system of claim 1, wherein the first processing device is configured to:
   adjust expected receiving timing to match with the normalized delay; and
   communicates with the plurality of active UEs via the second processing device, the first tracking antenna, the first feeder link, and the first satellite.

19. The GSM satellite communication system of claim 1, wherein the first plurality of cells are ground cells fixed on a surface of earth that includes land and ocean.

20. The GSM satellite communication system of claim 1, wherein:
   the first plurality of cells are moving cells on one or more airborne planes; and
   the plurality of active User Equipment (UEs) are on the one or more airborne planes.

21. A GSM (Global-System-for-Mobiles) satellite communication system in communication with a first satellite having a first field of view including a first plurality of cells in which a plurality of active User Equipment (UEs) are located, the plurality of active UEs being in direct communication with the first satellite, the satellite communication system comprising:
   a first feeder link and a first tracking antenna configured to communicate with the plurality of active UEs via the first satellite directly serving the first plurality of cells; and
   a first processing device configured to:
      communicate with the plurality of active UEs via the first tracking antenna, the first feeder link, and the first satellite, wherein when an elevation angle between ground and a beam from the first satellite to a cell of the first plurality of cells is equal to or larger than a threshold value of 43.183 degrees, a normal 3GPP timing advance range is used, and
      when the elevation angle is smaller than the threshold value, an extended timing advance range is used; and
      adjust expected receiving timing to match with a normalized delay of a plurality of beam centers of the first plurality of cells.

22. The GSM satellite communication system of claim 21, further comprising:
   a second processing device configured to normalize delay for a plurality of beam centers of the first plurality of cells, and provide the normalized delay to the first processing device; wherein:
   the first processing device is configured to communicate with the plurality of active UEs via the second processing device, the first tracking antenna, the first feeder link, and the first satellite.

23. The GSM satellite communication system of claim 22, wherein the second processing device is further configured to perform Doppler compensation for the plurality of beam centers of the first plurality of cells, and provide compensated frequencies to the first processing device.

24. The GSM satellite communication system of claim 22, wherein:
   the first processing device is a processing device of a GSM base transceiver station; and
   the second processing device is a processing device of a routing-and-compensating device.

* * * * *